United States Patent [19]

Fitzpatrick et al.

[11] 4,379,299

[45] Apr. 5, 1983

[54] RECORDING STRUCTURE FOR DIRECT READ AFTER WRITE RECORDING

[75] Inventors: Brian J. Fitzpatrick; Rameshwar N. Bhargava, both of Ossining, N.Y.; Alfred E. Milch, Teaneck, N.J.; Pedro Tasaico, Windsor, N.Y.

[73] Assignee: North American Philips Corporation, New York, N.Y.

[21] Appl. No.: 251,419

[22] Filed: Apr. 6, 1981

[51] Int. Cl.³ .............................................. G01D 15/34
[52] U.S. Cl. .................................... 346/1.1; 346/76 L; 346/135.1; 430/945
[58] Field of Search .................. 346/135.1, 76 L, 1.1; 430/945, 94

[56] References Cited

U.S. PATENT DOCUMENTS

| | | | |
|---|---|---|---|
| 4,158,715 | 6/1979 | Smith | 346/76 L X |
| 4,176,277 | 11/1979 | Bricot | 346/135.1 X |
| 4,214,249 | 7/1980 | Kasai | 346/76 L |
| 4,238,803 | 12/1980 | Terao | 346/76 L X |
| 4,264,911 | 4/1981 | Wilkinson | 346/135.1 |
| 4,278,734 | 7/1981 | Ohta | 346/76 L X |
| 4,318,112 | 3/1982 | Kivits | 346/135.1 |

*Primary Examiner*—Joseph W. Hartary
*Attorney, Agent, or Firm*—Paul R. Miller

[57] ABSTRACT

An information recording medium uses a semiconductor film on a plastic substrate for obtaining a direct read after write digital recording with laser recording and writing devices. The writing laser produces an area of generated heat in the semiconductor film which produces a heated region in the underlying plastic substrate. The heated plastic substrate material decomposes or degases yielding gaseous components with a high pressure that will burst the overlying semiconductor layer leaving a pit or hole in the reflective surface.

2 Claims, 4 Drawing Figures

RECORDING STRUCTURE FOR DIRECT READ AFTER WRITE RECORDING

BACKGROUND OF THE INVENTION

The present invention relates to a recording medium, and more particularly, to a recording medium useful in direct read after write (DRAW) recording arrangements.

One of the problems encountered in recording with a modulated radiation beam, such as a laser or an electron beam, is that a relatively high power radiation beam must be utilized. The power requirements of the laser may be reduced somewhat if a photographic process of recording is used. Unfortunately, this is not the most desirable apparatus, due to the fact that the recording must be completed and the medium must be developed prior to reading the recording. Therefore, any error made during the initial stages of recording may not become apparent until considerable recording and development time has been wasted.

It is far more desirable to use a recording medium that is capable of being read immediately after recording. Such direct read after write recording mediums are generally recorded on by a process that uses a first laser beam to locally affect a surface, such as by forming a pit or a bubble, which changes the local reflection characteristics of the surface. Such change in local reflection characteristics can be immediately detected by a second lower powered laser to read information on the surface, which is written into the surface by way of pit or bubble. The formation of a local area of a sufficient size to be detected by the read laser beam requires a writing laser having substantial radiation power.

SUMMARY OF THE INVENTION

The present invention undertakes to avoid the difficulties of the prior art in which DRAW recording mediums can be used with lasers of less than 10mW power. This is achieved according to the invention by forming the recording medium from a plastic substrate with a semiconductor film overlying the substrate. Such a recording medium accomplishes formation of gas pockets at local areas with non-melting of the plastic substrate during laser information writing, which gas pockets cause holes to be formed in the surface semiconductor reflective material. That is, the gaseous components of the plastic substrate are initially contained in local pockets and eventually burst through the semiconductor film.

In order to achieve these results in the present invention, semiconductor materials which have a high absorption coefficient for a writing laser wavelength, a low thermoconductivity, and ease of deposition as an impervious film are useful. Group II–VI semiconductor compounds meet these requirements, and in addition can have wavelength absorption edges matching most of the common gas lasers and semiconductor lasers. Examples of such semiconductor materials may be cadmium sulfide, cadmium selenide, cadmium telluride, zinc sulfide, zinc selenide, zinc telluride, etc. and alloys of such materials. A valuable semiconductor material is cadmium telluride which is environmentally stable and has a good value of sensitivity.

The underlying substrate material could be polymethylmethacrylate (PMMA) which would decompose or degas yielding gaseous fragments such as $H_2O, CO, CO_2$, having a high vapor pressure to burst the overlying semiconductor layer. A polycarbonate plastic substrate material would more beneficially generate $CO_2$ as a decomposition product, and therefore probably be better for the plastic substrate. Other plastics and surface treatments may also be useful.

Structures of this type have been found to be valuable for optical disk arrangements in video players.

Accordingly, one object of this invention is to provide a recording medium obviating the drawbacks and disadvantages of the prior art.

A further object of this invention is to form a DRAW recording medium utilizing low power writing and reading lasers, particularly for use in writing and reading digital information.

These and other objects and aspects of the present invention may be more readily understood by reference to the accompanying drawing figures, which show by way of example only one embodiment of the present invention.

DETAILED DESCRIPTION OF A PREFERRED EMBODIMENT

Figure 1:
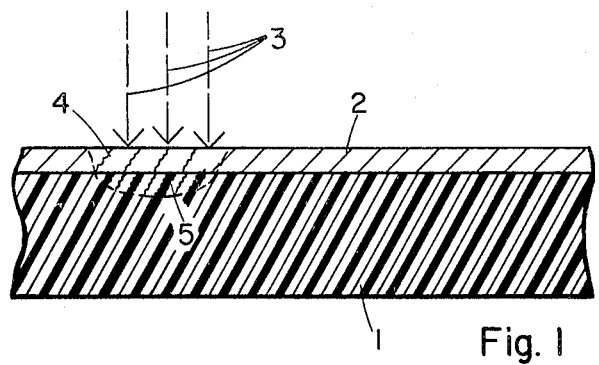
FIG. 1 illustrates in partial cross section an aspect of the present invention at an initial stage.
Figure 2:
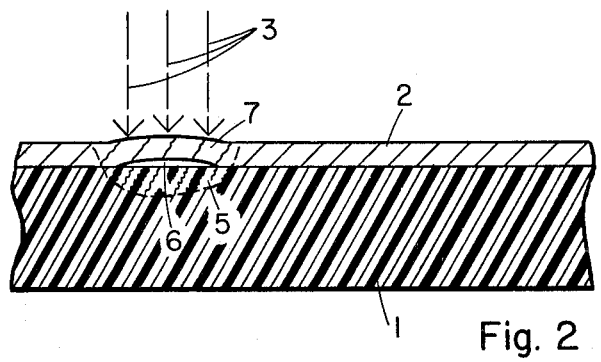
FIG. 2 illustrates the formation of a gas bubble in the structure of the present invention.

By reference to FIG. 1, the recording medium of the present invention consists of a plastic substrate 1 having an overlying semiconductor film 2. A laser informaton writing beam 3 is applied to local regions of the semiconductor film surface, thereby forming an area 4 of generated heat. A region 5 of the plastic substrate lying immediately below the heat generated area 4 of the semiconductor film becomes heated and decomposes or degases, thereby forming gaseous components with a high pressure. This leads to formation of the gas bubble 6 in FIG. 2.

Figure 3:
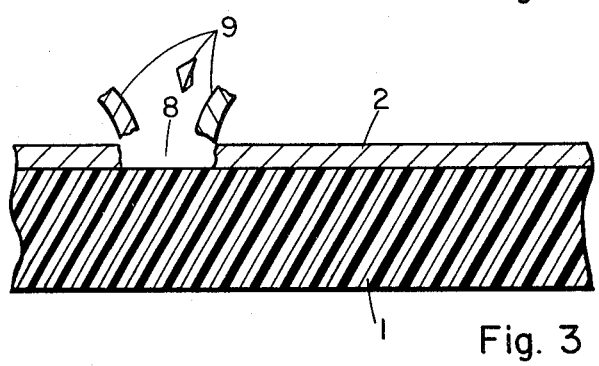
FIG. 3 illustrates formation of a pit or hole upon bursting of the bubble.
Figure 4:
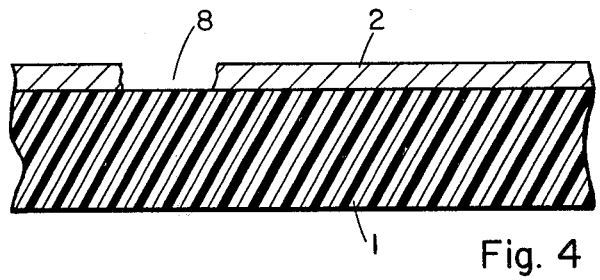
FIG. 4 illustrates the formed pit or hole in the DRAW structure.

The gaseous fragments and components being under a high pressure in the bubble 6 will cause the overlying semiconductor layer to locally burst out with fragments 9 to form a pit 8 or a hole in the reflective semiconductor surface as seen in FIG. 3. The formed hole, as seen in FIG. 4, becomes a bit of information written into the recording medium, which can be immediately read out by a read laser beam. Typical hole sizes could be 1 micron.

It has been found that the hole size generated according to the present invention is larger with plastic type substrates than with recording mediums having glass substrates. The plastic material, being a polymethylmethacrylate or a polycarbonate, for example, generates high pressure gaseous components in a relatively low heat power range. Consequently, low power writing and reading lasers can be utilized, such as those having powers under 10mW.

A further beneficial aspect of the present invention is the utilization of a group II–VI semiconductor compound material for the semiconductor film. Such semiconductor materials have a high absorption coefficient for most useful information writing lasers, both gaseous type and semiconductor type lasers. Further, the semiconductor material layer of the recording medium has low thermoconductivity thereby enabling a high temperature generation from the laser. A thickness of 1000 Å to 1500 Å is useful for the semiconductor layer.

An example of a DRAW writing system may be set forth as follows. An argon-ion laser, emitting at 488.0 nm (nanometers) could be used to write on a layer of cadmium telluride deposited on a polymethylmethacrylate substrate. This cadmium telluride film is an environmentally durable material with an energy absorption edge at 860 nm. The readout of the information could be achieved with the same laser. Other lasers which could be useful are helium-cadmium (441.6 nm), helium-neon (632.8 nm) and krypton-ion (476.9 nm). The argon laser could also be operated at different wavelengths such as 457.9 nm or 514.5 nm.

Cadmium telluride which is a stable, high melting point material has been found to be an important material for use in that it has a sensitivity equivalent to tellurium without optimizing the film thickness, and it is environmentally stable. This is important for archival recording. In the recording process, it has been found that CdTe does not melt, and only tears, i.e. forms holes, when substantial distortion occurs. This process is apparently quite sudden and complete since no partially torn pits occur.

While we have described and disclosed a single embodiment of our invention, we do not intend to be so limited, and the present invention is to reside in all embodiments, changes, and modifications which may be covered by the following claims.

What we claim:

1. A method of writing information on a recording medium comprising the steps of forming a Group II-IV semiconductor film of CdTe on a plastic substrate, directing a laser beam to the surface of said semiconductor film, locally generating an area of heat at said semiconductor film where said laser beam is applied, generating high pressure gaseous components of said plastic substrate adjacent to said heated areas of said semiconductor film, and causing said gaseous components to burst through said semiconductor film.

2. A method according to claim 1 wherein said plastic substrate is one of polymethylmethacrylate and a polycarbonate plastic material.

* * * * *